United States Patent [19]
Patton et al.

[11] Patent Number: 5,088,626
[45] Date of Patent: Feb. 18, 1992

[54] SALAD BAR APPARATUS

[76] Inventors: John D. Patton, 800 Quesnel Dr., Virginia Beach, Va. 23454; Elwood Whitney, 5520 Lynbrook Landing, Virginia Beach, Va. 23462

[21] Appl. No.: 609,235
[22] Filed: Nov. 5, 1990
[51] Int. Cl.[5] .............................................. B67D 5/64
[52] U.S. Cl. ...................................... 222/132; 62/249; 222/146.6; 222/158; 222/426; 222/449; 222/450
[58] Field of Search ...................... 222/132, 146.6, 158, 222/425, 426, 449, 450; 62/246, 249, 255

[56] References Cited

U.S. PATENT DOCUMENTS

| | | | |
|---|---|---|---|
| 844,686 | 2/1907 | Marschall | 222/425 X |
| 866,747 | 9/1907 | Thomas et al. | 222/450 X |
| 943,854 | 12/1909 | Whitten et al. | 222/450 X |
| 2,518,134 | 8/1950 | Fredenhagen et al. | 62/249 |
| 3,190,509 | 6/1965 | Kirchhoefer | 222/450 |
| 3,327,902 | 6/1967 | Alterwitz | 222/108 |
| 4,060,183 | 11/1977 | Puurunen | 222/450 X |
| 4,572,598 | 2/1986 | Moore, Jr. | 312/312 X |
| 4,802,340 | 2/1989 | Johnson | 62/229 |
| 4,856,579 | 8/1889 | Wolfe | 62/458 X |
| 4,895,275 | 1/1990 | Quinn et al. | 222/478 X |

Primary Examiner—Kevin P. Shaver
Assistant Examiner—Joseph A. Kaufman
Attorney, Agent, or Firm—Leon Gilden

[57] ABSTRACT

An apparatus wherein an upper housing fixedly secures an aligned series of dispensing tubes. The dispensing tubes include an upper opaque portion overlying a conical lower transparent portion. The upper portion includes a first valve to dispense food components into the lower portion, with the lower portion including a second valve tube to permit directing of the food onto individual plates by patrons of the apparatus. The organization includes a catch tray underlying a support grid to contain food components having fallen through the support grid. The invention may further include a modified dispensing tube housing defining an enclosed conduit operably associated to an air conditioning duct to provide cooling and chilling of food components contained within the dispensing tubes.

1 Claim, 4 Drawing Sheets

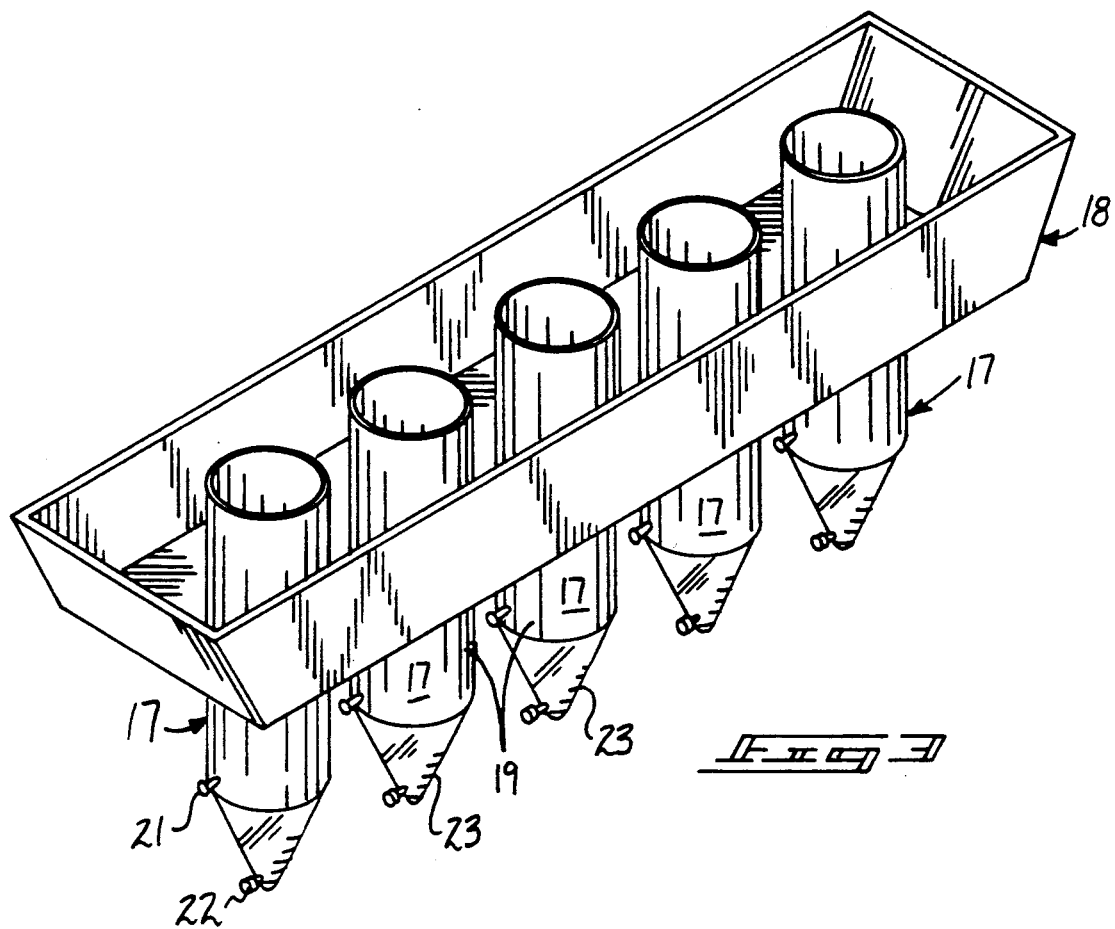
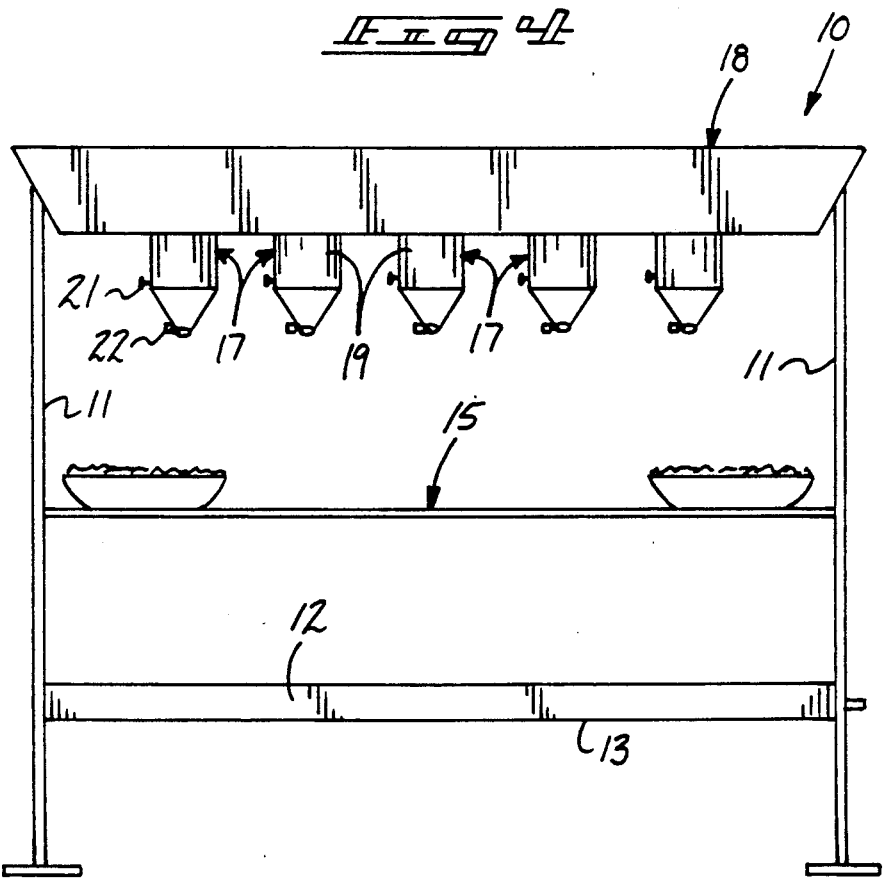

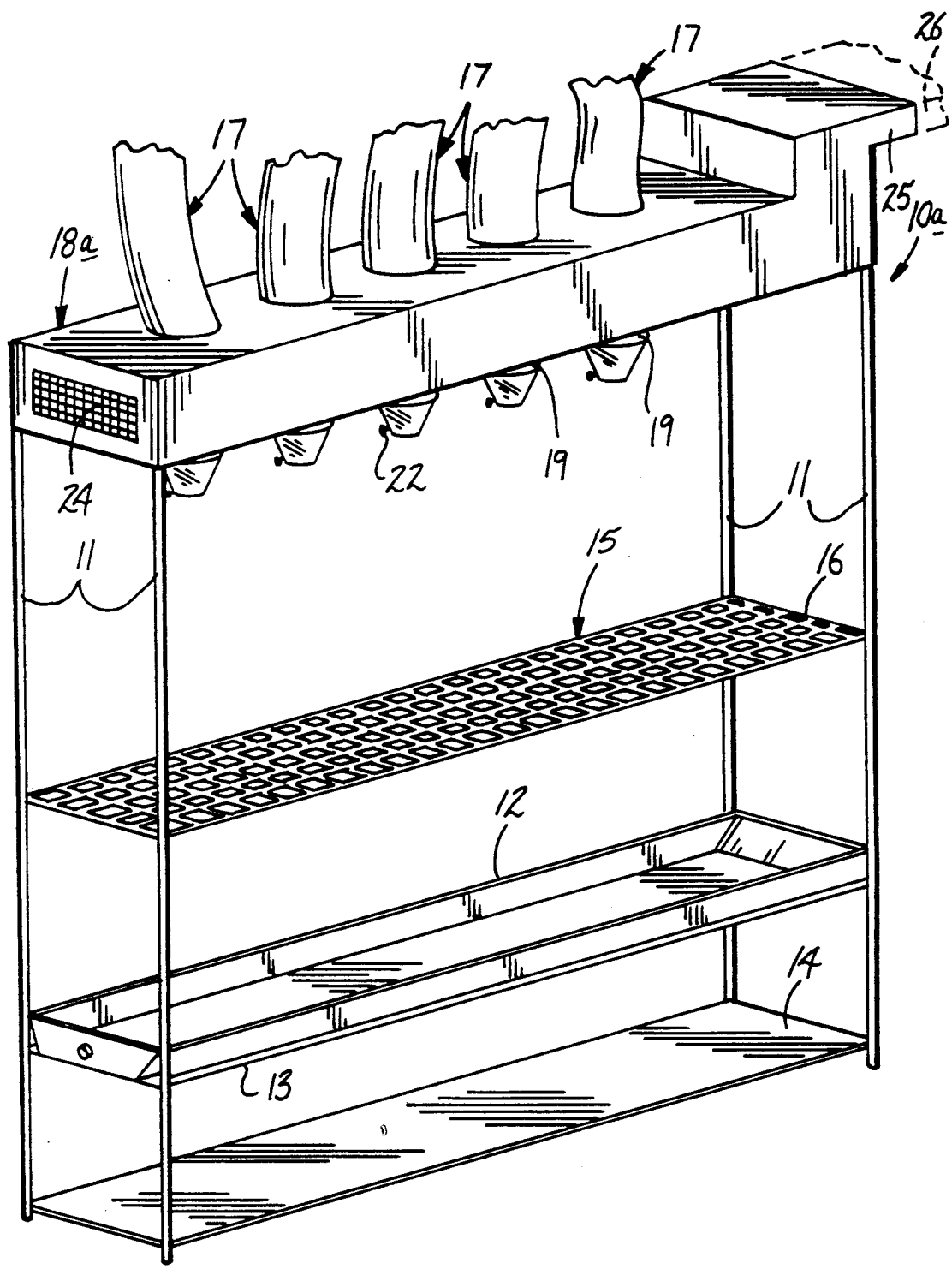

SALAD BAR APPARATUS

BACKGROUND OF THE INVENTION

1. Field of the Invention

The field of invention relates to salad bar structure, and more particularly pertains to a new an improved salad bar apparatus wherein the same provides for a convenient and sanitary dispensing of discrete portions of food in a salad bar scenario.

2. Description of the Prior Art

Conventional salad bars provide varying applications of refrigeration to contain food components for selection by patrons. The use of such containers in conventional salad bars requires multiple handling of utensils and potential unhealthy manipulation of food components contained within the containers. The instant invention attempts to overcome deficiencies of the prior art by providing dispensing tubes that permit individuals to dispense predetermined portions into a lower portion of a dispensing tube for visual observation thereof and permit the dispensing of discrete portions of that food into a support plate and the like for use by individuals in a sanitary manner. Examples of prior art salad bar structure may be found in U.S. Pat. No. 4,802,340 to Johnson setting forth a refrigerated salad bar directing refrigerant to containers mounted within the framework of the salad bar structure.

U.S. Pat. No. 4,572,598 to Moore, Jr. sets forth a salad bar structure wherein various food support trays are mounted within refrigerated ice in a surrounding relationship.

U.S. Pat. No. 4,856,579 to Wolfe provides for alternative heating and cooling of food in a salad bar by directing such heating and cooling in a surrounding relationship underlying the support containers of the salad bar.

U.S. Pat. Nos. Des. 282,612 and 260,708 set forth further examples of conventional salad bar configurations.

As such, it may be appreciated that there continues to be a need for a new and improved salad bar apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of salad bar organizations now present in the prior art, the present invention provides a salad bar apparatus wherein the same provides for sanitary selective dispensing of food components in a salad bar organization. As such, the general purpose of the present invention, which will be described subsequently in greater detail, is to provide a new and improved salad bar apparatus which has all the advantages of the prior art salad bar organizations and none of the disadvantages.

To attain this, the present invention provide an apparatus wherein an upper housing fixedly secures an aligned series of dispensing tubes. The dispensing tubes include an upper opaque portion overlying a conical lower transparent portion. The upper portion includes a first valve to dispense food components into the lower portion, with the lower portion including a second valve tube to permit directing of the food onto individual plates by patrons of the apparatus. The organization includes a catch tray underlying a support grid to contain food components having fallen through the support grid. The invention may further include a modified dispensing tube housing defining an enclosed conduit operably associated to an air condition duct to provide cooling and chilling of food components contained within the dispensing tubes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present construction to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. It is therefore an object of the present invention to provide a new and improved salad bar apparatus which has all the advantages of the prior art salad bar organizations and none of the disadvantages.

It is another object of the present invention to provide a new and improved salad bar apparatus which may be easily and efficiently manufactured and marketed.

It is a further object of the present invention to provide a new and improved salad bar apparatus which is of a durable and reliable construction.

An even further object of the present invention is to provide a new and improved salad bar apparatus which is susceptible of a low cost of manufacture with regard to both materials and labor, and which accordingly is then susceptible of low prices of salt to the consuming public, thereby making such salad bar apparatus economically available to the buying public.

Still yet another object of the present invention is to provide a new and improved salad bar apparatus which provides in the apparatuses and methods of the prior art some of the advantages thereof, while simultaneously overcoming some of the disadvantages normally associated therewith.

Still another object of the present invention is to provide a new and improved salad bar apparatus wherein the same provides for individual dispensing of various food components preventing manual tampering and manipulation of those components.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of dispensing tubes utilized by the instant invention.

FIG. 4 is an orthographic frontal view, taken in elevation, of the invention.

FIG. 5 is an isometric illustration of a modification of the instant invention utilizing a cooling duct in surrounding relationship relative to dispensing tubes.

DESCRIPTION OF THE PREFERRED EMBODIMENT

Figure 1:
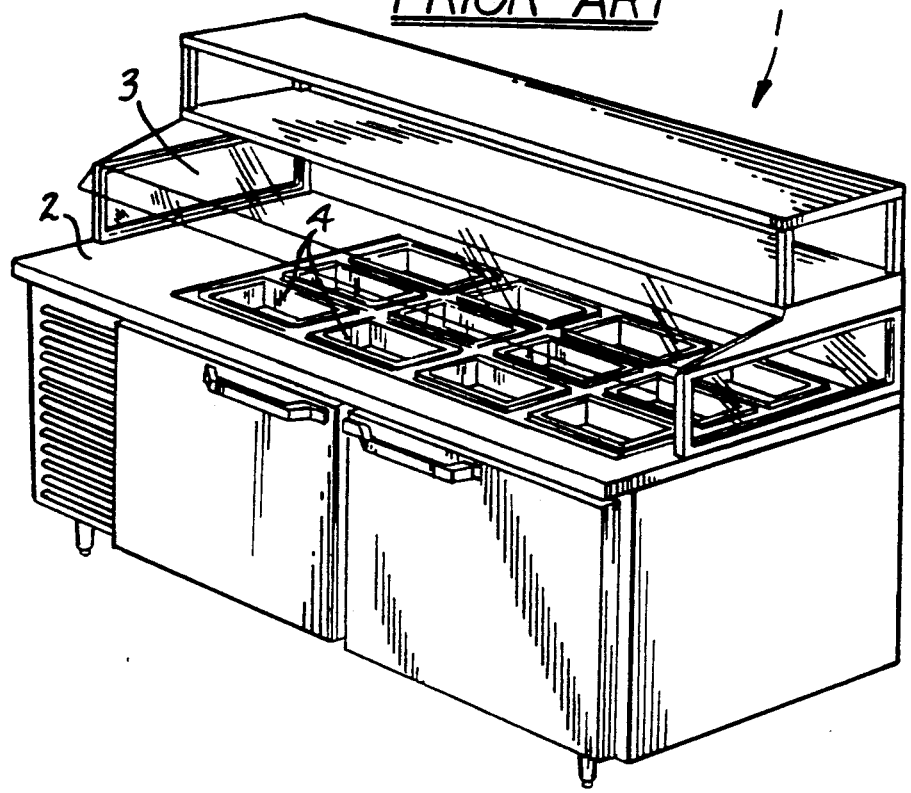
FIG. 1 is an isometric illustration of a prior art salad bar apparatus.

With reference now to the drawings, and in particular to FIGS. 1 to 7 thereof, a new and improved salad bar apparatus embodying the principles and concepts of the present invention and generally designated by the reference numeral 10 will be described.

Figure 2:
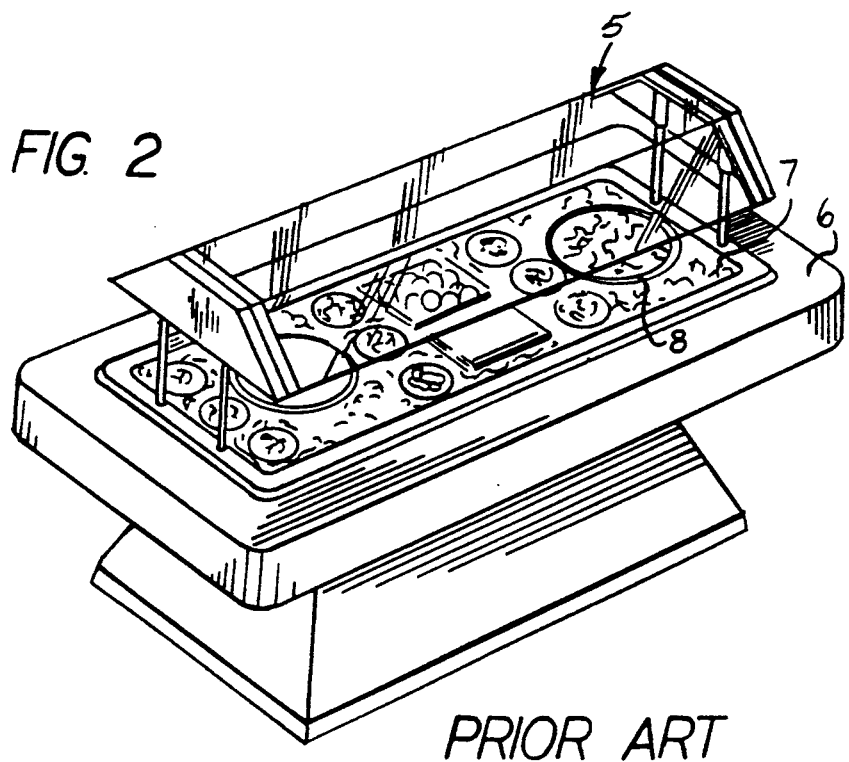
FIG. 2 is a further example of a prior art salad bar apparatus.

FIG. 1 illustrates a prior art salad bar apparatus 1, wherein a support framework 2 utilizing overlying covering 3 secures various trays 4 that are in communication with a refrigerating medium underlying the trays, in a manner as set forth in U.S. Pat. No. 4,802,340. FIG. 2 illustrates a further prior art salad bar apparatus 5, wherein the framework 6 includes a well structure 7 securing various food support trays 8 therewithin and surrounded by a cooling medium such as ice and the like.

More specifically, the salad bar apparatus 10 of the instant invention essentially comprises a plurality of support posts 11 defining a generally rectangular parallelepiped configuration fixedly mounting a medial support shelf 13 orthogonally between forward and rear pairs of the support posts 11. The medial support shelf 13 removably mounts a catch tray container 12 that is supported thereon, with the catch tray container 12 of a length coextensive with the medial support shelf 13 to contain and secure various food components inadvertently dropped thereon in a food dispensing procedure to be discussed below. An optional bottom storage shelf 14 (see FIG. 5) is removably mounted to bottom foot portions of each of the support posts. A support grid 15 is arranged parallel to and spaced above the catch tray container 12 and is formed of intersecting rods 16 fixedly and orthogonally arranged relative to one another to define an open rigid mesh organization to permit various food components directed onto the support grid 15 to be directed through the mesh and secured within the catch tray container 12 positioned therebelow and as illustrated, the support grid 15 is coextensive with the catch tray container 12 between forward and rear support post pairs as illustrated. A series of dispensing tubes 17 defines an aligned row of dispensing tubes equally spaced relative to one another, with each of the dispensing tubes mounted within a dispensing tube support housing 18. The support housing 18 secures the dispensing tubes therewithin, with the upper end of the dispensing tubes arranged for receiving and defining a magazine for securement of various quantities of salad bar type food components positioned within each of the dispensing tubes from above. Each dispensing tube is defined by an opaque cylindrical upper body portion 19 that is mounted within the dispensing tube support housing 18 and with each dispensing tube 17 directed below the dispensing tube support housing 18 terminating in a transparent conical lower portion 20 in contrast to the opaque cylindrical body portion 19. The transparent conical body portion 20 includes a series of gradations 23 mounted thereon, whereupon visual observation of each concentration of food contained within each lower portion 20 a patron may dispense a predetermined quantity of such food from the lower portion, in a manner to be described. A reciprocatably mounted first valve rod 21 is mounted diametrically through the opaque cylindrical body portion 19 and extends outwardly thereof terminating in a first valve rod handle. By retraction of the first valve rod 21, a predetermined quantity of a food component is directed from the opaque cylindrical body portion 19 into the underlying transparent conical lower portion 20, wherein a patron may dispense an initial quantity of food through a first valve, including the first valve rod 21 into the conical lower portion 20, whereupon a second valve including a second valve rod 22 that is rotatably mounted about a lower terminal end of the lower portion 20 permits dispensing of food into support grids and the like, as illustrated in FIG. 4.

Figure 6:
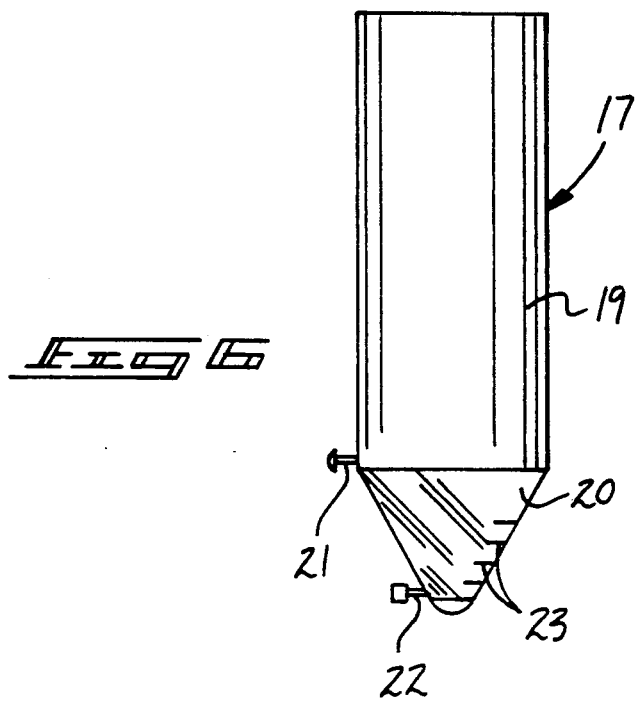
FIG. 6 is an orthographic view, taken in elevation, of a typical dispensing tube utilized by the instant invention.
Figure 7:
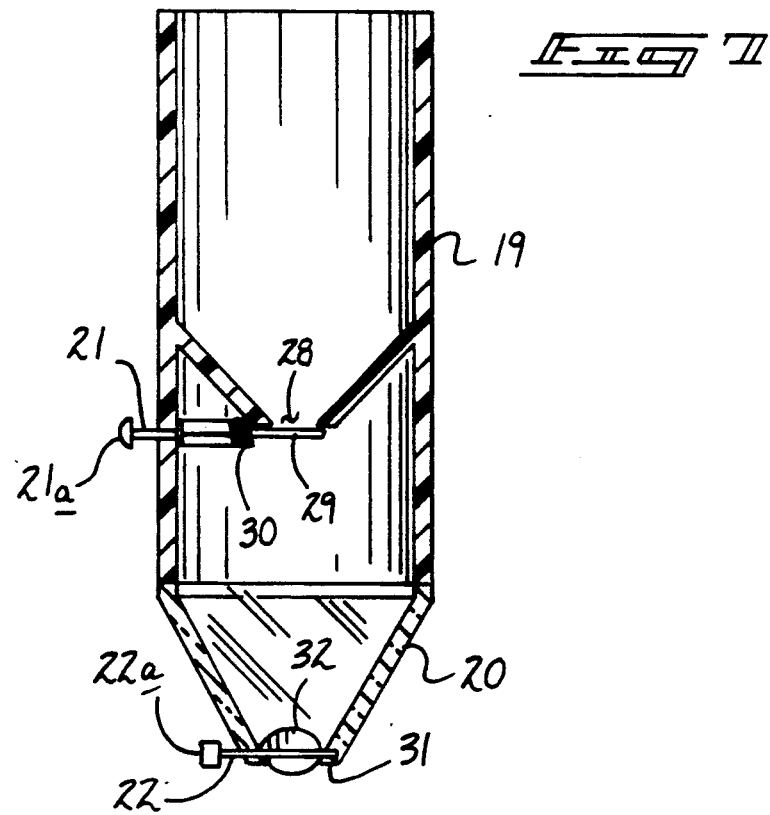
FIG. 7 is an orthographic cross-sectional illustration of one of the dispensing tubes utilized by the instant invention.

Reference to FIGS. 6 and 7 illustrate a typical dispensing tube 17 utilized wherein the opaque cylindrical body portion 19 includes a conical funnel 27 fixedly mounted coaxially within the body portion 19 overlying the lower portion 20. The conical funnel 27 terminates in a lowermost annular funnel outlet 28 defined by a first predetermined diameter, wherein a first valve plate 29 overlies the funnel outlet 28 and is also defined of a diameter substantially equal to the first predetermined diameter. A compression spring 30 is mounted between the first valve plate 29 and an interior surface of the body portion 19 in surrounding relationship relative to the first valve rod 21 to bias the first valve plate 29 into an initial position to overlie the funnel outlet 28. Upon food being dispensed into the transparent conical lower portion 20, an individual may by rotation of the second valve rod 22 utilizing the second valve rod handle 22a effect rotation of a second valve plate 32 within the second outlet opening 31 formed at a lower terminal end of the lower portion 20. The second outlet opening 31 is defined by a second predetermined diameter and the second valve plate 32 of an annular configuration also of the second predetermined diameter.

FIG. 5 illustrates a modified salad bar apparatus 10a, wherein a modified dispensing tube support housing 18a is utilized defining an enclosed conduit, with an inlet duct 25 at one end thereof and an outlet duct 24 at an opposite end, wherein the inlet duct 25 is fixedly and in communication with an air conditioner duct member 26 to direct air conditioning cooling air through the defined conduit of the modified dispensing support housing 18 to effect chilling and refrigeration of food components within the dispensing tube 17.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A salad bar apparatus comprising,
   a framework, the framework including a support grid mounted within the framework, the support grid spaced from and underlying a dispensing tube support housing, with the dispensing tube support housing mounted in the framework, and the dispensing tube support housing including a plurality of dispensing tubes fixedly mounted within the dispensing tube support housing, and each dispensing tube including an upper dispensing tube portion fixedly mounted within the dispensing tube support housing, and a lower portion positioned below the dispensing tube support housing coaxially aligned with the upper dispensing tube portion to direct a food component through each dispensing tube, and
   wherein the upper dispensing tube portion is opaque and the lower dispensing tube portion is transparent, and the upper dispensing tube portion includes a first valve to direct food from the upper dispensing tube portion into the lower dispensing tube portion, and the lower dispensing tube portion includes a second valve to direct food contained within the lower dispensing tube portion to a position exteriorly thereof, and
   wherein the upper dispensing tube portion is cylindrical and the lower dispensing tube portion is conical and includes a series of gradations mounted thereon for visual observation of a quantity of food to be dispensed from the lower dispensing tube portion, and
   further including a medial support shelf spaced below and parallel the support grid, the medial support shelf including a catch tray container removably mounted overlying the medial support shelf and coextensive therewith to receive and contain food components directed through the support grid, the support grid formed of intersecting rods to define an open rigid mesh, and
   wherein the first valve includes a rod reciprocatably and diametrically directed through the upper dispensing tube portion, and the reciprocatable rod including a first valve plate, and a conical funnel coaxially arranged within the upper dispensing tube portion, with the conical funnel including a lowermost funnel outlet overlying the first valve plate, and the lowermost funnel outlet defined by a first predetermined diameter and the first valve plate defined by a diameter equal to the first predetermined diameter, and a biasing means secured to the first valve rod to bias the first valve plate into a first position overlying the lowermost funnel outlet and manually displaced to a second position removed from the lowermost funnel outlet, and
   wherein the lower dispensing tube portion includes a second outlet opening formed at a lower terminal end thereof defined by a second predetermined diameter, and the second valve rod rotatably mounted through the second outlet opening and including a second valve plate rotatably mounted within the second outlet opening, wherein the second valve plate is of an annular configuration and of a valve plate diameter equal to the second predetermined diameter, and
   wherein the dispensing tube support housing includes an enclosed conduit, and a cooling medium delivery conduit, and the enclosed conduit including an inlet opening in communication with the cooling medium delivery conduit including a cooling medium, and the cooling medium directed through the dispensing tube support housing about each upper dispensing tube portion, and the dispensing tube support housing including an outlet to direct the cooling medium therefrom and to permit circulation thereof.

* * * * *